(12) United States Patent
Aylsworth (10) Patent No.: US 6,923,614 B2
(45) Date of Patent: *Aug. 2, 2005

(54) MAGAZINE LUMBER FEEDER

(75) Inventor: Steven L. Aylsworth, Chatfield, MN (US)

(73) Assignee: Acer, Inc., Rochester, MN (US)

( * ) Notice: Subject to any disclaimer, the term of this patent is extended or adjusted under 35 U.S.C. 154(b) by 302 days.

This patent is subject to a terminal disclaimer.

(21) Appl. No.: 09/970,947

(22) Filed: Oct. 4, 2001

(65) Prior Publication Data

US 2002/0127093 A1 Sep. 12, 2002

Related U.S. Application Data

(60) Provisional application No. 60/238,052, filed on Oct. 5, 2000.

(51) Int. Cl.$^7$ ............................................... B65G 59/06
(52) U.S. Cl. ................... 414/797.4; 414/789.5
(58) Field of Search ................ 414/789.5, 797.8, 414/797.9, 797.4; 198/463.4; 221/298

(56) References Cited

U.S. PATENT DOCUMENTS

| | | | | |
|---|---|---|---|---|
| 2,730,144 A | * | 1/1956 | Joa ..................... | 414/798.1 X |
| 4,324,520 A | * | 4/1982 | Kjellberg ................ | 414/789.5 |
| 5,863,176 A | * | 1/1999 | Newnes et al. .......... | 414/789.5 |
| 6,379,105 B1 | * | 4/2002 | Aylsworth ............... | 414/796.2 |

FOREIGN PATENT DOCUMENTS

EP          0 141 064 A1  *  5/1985

* cited by examiner

Primary Examiner—Janice L. Krizek
(74) Attorney, Agent, or Firm—Dorsey & Whitney LLP (57) ABSTRACT

The present invention provides an efficient, reliable lumber magazine feeder that can supply large numbers of boards of all sizes. Some embodiments of this magazine lumber feeder comprise of one or more modules, each capable of dispensing a particular width of board. These modules may comprise a gripper/shuttle assembly, an overhead rail, and an adjustable lumber support. The gripper/shuttle assembly contains hydraulic valving to operate two hydraulic cylinders. The first cylinder grips the bottom most board in the stack by clamping onto the narrow dimension on a board. The second cylinder is capable of moving the gripper assembly in a push or pull direction, thus sliding the bottom board from its stacked position.

The present invention may also include a programmable logic controller that receives electronic commands from an automatic saw, or the like. The controller in some embodiments receives electronic signals representing a desired board size from the automatic saw. The controller 34 then processes those signals and activates the correct module, which causes the feeder to dispense one board. Each request sent to the controller in these embodiments will result in one board being dispensed.

18 Claims, 7 Drawing Sheets

MAGAZINE LUMBER FEEDER

CROSS REFERENCE TO RELATED APPLICATIONS

This application claims priority from U.S. provisional application No. 60/238,052, filed Oct. 5, 2000, entitled, "MAGAZINE LUMBER FEEDER, which is hereby incorporated by reference in its entirety.

FIELD OF THE INVENTION

The present invention generally relates to a method and apparatus for storing and selectively dispensing items. More particularly, the present invention relates to a magazine lumber feeder for dispensing various sized boards to an automatic saw, or the like.

BACKGROUND

Many manufacturers now use computer-operated saws, lathes, milling machines, welding machines, and the like, to produce their products. These automated machines can provide significant cost savings when compared to manual methods. One problem with these systems, however, has been a lack of an efficient, reliable system for feeding various sizes of stock. In particular, there has been a problem feeding lumber of various lengths, widths, and heights to automatic saws. This problem has prevented manufacturers from fully utilizing the power of their automated saws.

Figure 1:
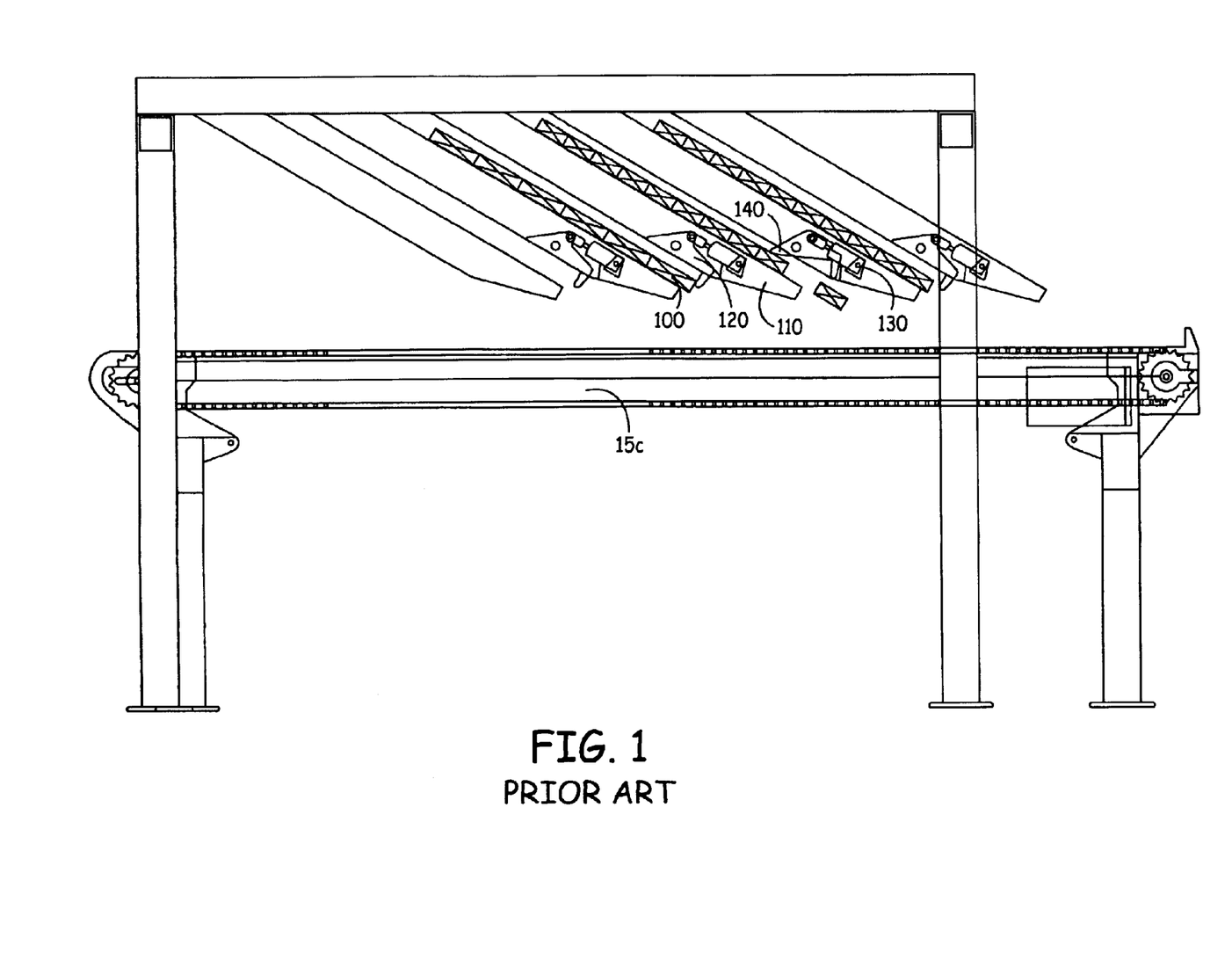
FIG. 1 (prior art) is a side view of a conventional lumber feeder.
Figure 2:
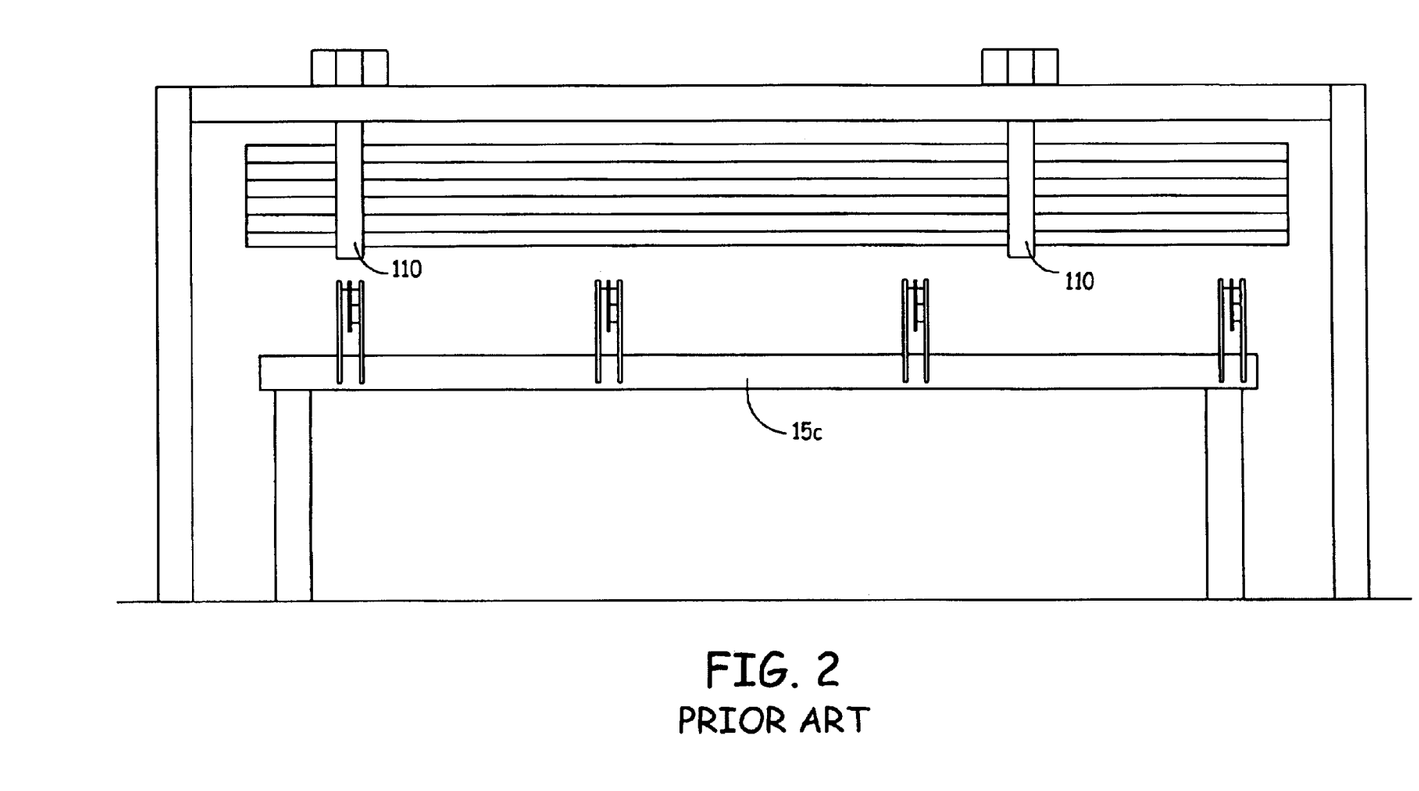
FIG. 2 (prior art) is a front view of the lumber feeder in FIG. 1.

FIGS. 1–2 (prior art) show one partial solution to this problem. The operator of this apparatus laid lumber boards 100 edge to edge on angled arms 110 (approximately 30° from horizontal). A release arm 120, held in a "closed" position by a pneumatic actuator 130, locked the boards 100 in the apparatus. Upon command, the pneumatic actuator 130 opened to release the bottom board and to almost simultaneously cause the "heel" 140 of the release arm to grip the next board. This allowed one board to drop onto the conveyor 150. The release arm was held in this open position for a short time to allow the released board to get clear and then was reset to the closed position. The stack of boards then slid downward against the release arm.

One problem with this apparatus, however, is that it required several angled support arms to support the lumber, particularly longer boards. Each of these angled arms had its own release arm/actuator that needed to open and close in unison with others supporting that board. This coordination problem often caused jamming, particularly with twisted or warped lumber. Another problem is that the machine only offered limited capacity for wide boards, such as 2"×10" and 2"×12" boards. Still another problem was that it was difficult to load longer lumber into this apparatus.

Accordingly, there is a need for an efficient, reliable magazine lumber feeder that can supply large numbers of boards of all sizes.

SUMMARY OF THE INVENTION

The present invention provides an efficient, reliable lumber magazine feeder that can supply large numbers of boards of all sizes. One aspect of the present invention is a material handling apparatus, one embodiment of which comprises a first load supporting surface and a second load supporting surface that cooperate to support a first end and a second end of an item, an item receiver located below the first and second load supporting surfaces, and a shuttle adapted to operably engage the item and to translate the item off the first and second load supporting surfaces, thereby allowing the item to drop onto the item receiver.

Another aspect of the present invention is an apparatus for selectively delivering items. One embodiment of this apparatus comprises a first load supporting surface and a second load supporting surface that together cooperate to support a first end and a second end of a first item; an item receiver located below the first and second load supporting surfaces, a first bias element that biases the first end of the item off the first load supporting surface, and a second bias element that biases the second end of the item off the second load supporting surface, thereby allowing the item to drop onto the item receiver.

Still anther aspect of the present invention is a method of selectively delivering items. One embodiment of this method comprises placing a plurality of first items on a first load supporting surface and a second load supporting surface, the plurality of first items including a bottom first item, placing a plurality of second items on a third load supporting surface and a fourth load supporting surface, the plurality of second items including a bottom second item, receiving a signal requesting delivery of the bottom first item, biasing a first end of the bottom first item off the first load supporting surface; and biasing a second end of the bottom first item off the second load supporting surface, whereby the bottom item drops onto an item receiver.

The present invention also includes a magazine unloader for selectively delivering a plurality of first boards and a plurality of second boards, and a magazine unloader module adapted to receive a plurality of items. One magazine unloader embodiment comprises a first module adapted to receive a plurality of first boards, a second module adapted to receive a plurality of second boards, a first bias assembly adapted to bias a board in the plurality of first boards out of the first module; and a second bias assembly adapted to bias a board in the plurality of second boards out of the second module. One magazine unloader module comprises a support, a first load supporting surface and a second load supporting surface operably connected to the support, a gripper adapted to engage the item; a shuttle assembly adapted to translate the gripper relative to the second load supporting surface.

The present invention provides numerous advantages over conventional magazine lumber feeding machines. For example, the width and length of the boards do not affect the number of boards that the present invention can receive and selectively deliver. The modular design of the present invention also provides scalability and the ability for customization. These and other features and advantages will become better understood with reference to the following description, appended claims, and accompanying drawings.

DETAILED DESCRIPTION

Figure 3:
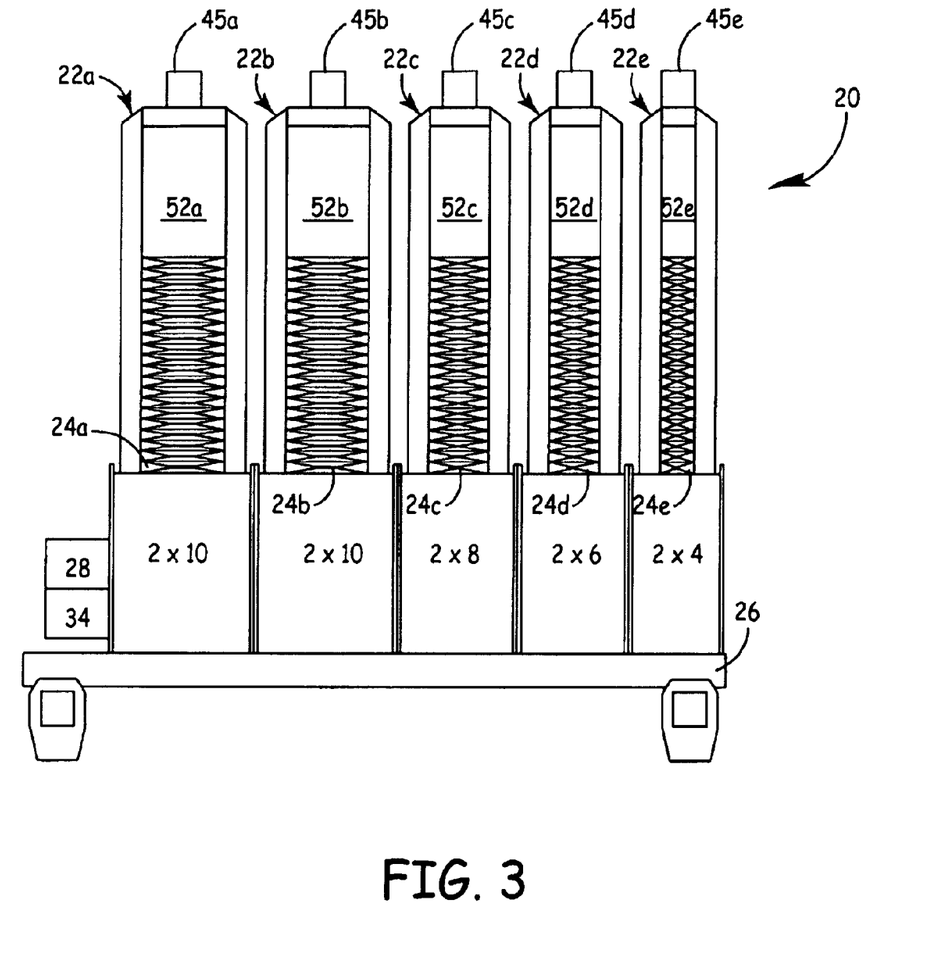
FIG. 3 is a front view of a magazine lumber feeder embodiment of the present invention, as viewed from the loading end.

FIG. 3 is a front view of one magazine lumber feeder embodiment 20. This magazine lumber feeder embodiment 20 is a modular machine used to store and dispense lumber to a saw or other automated machine. It consists of one or more modules 22a–22e, each capable of dispensing a particular width of board 24a–24d. The modules 22a–22e are clamped to a common support rail system 26 and receive power from a common hydraulic power supply 28. Each module 22a–22e also includes an overhead rail 45a–45e and an adjustable lumber support 46 (see FIGS. 5–7).

Figure 4:
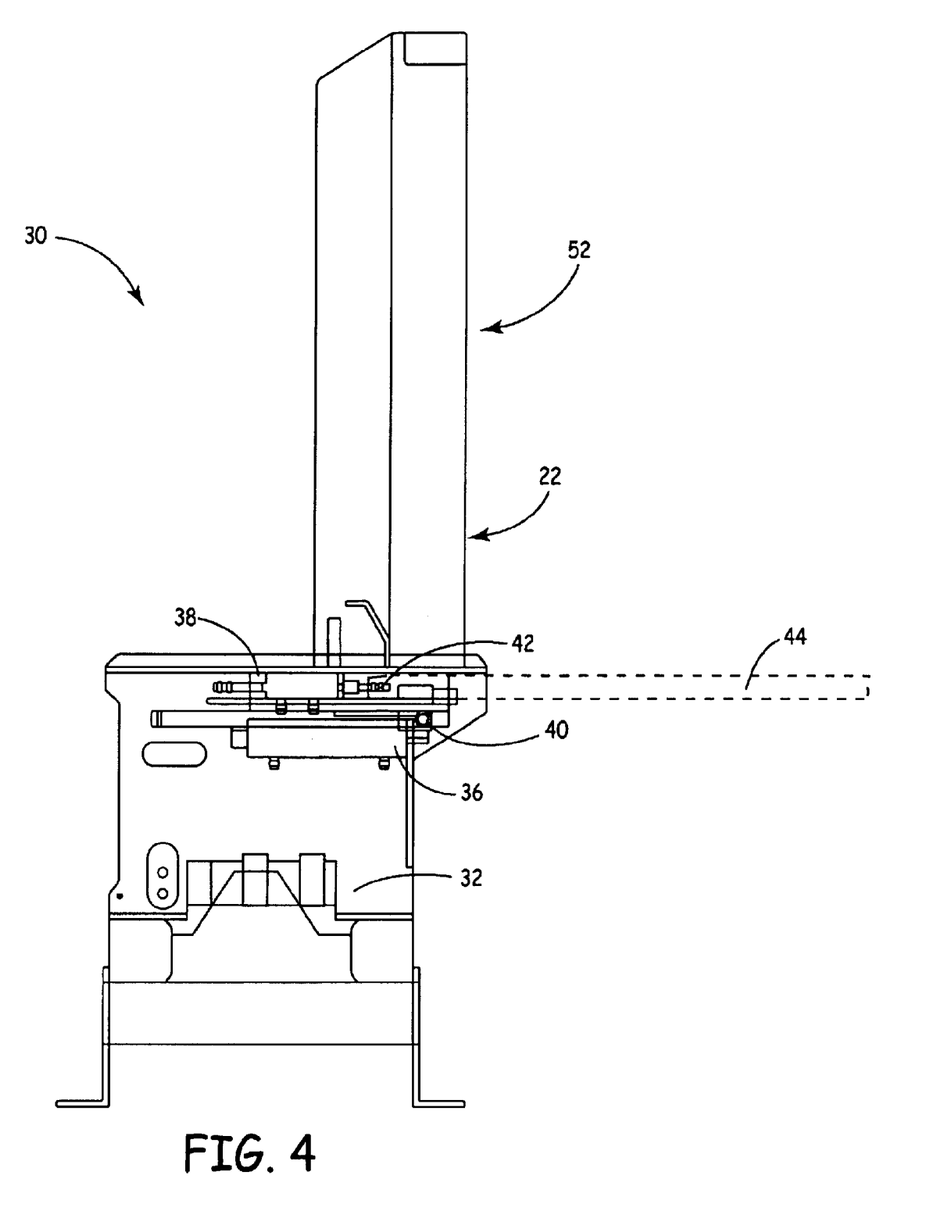
FIG. 4 is a side view of a fixed side assembly embodiment, showing a bottom board shown in dashed lines, and with some components removed for clarity.

FIG. 4 is a side view of a fixed side assembly 30 of one the modules 22a–22e. It will be understood that this assembly 30 could be used for any one of the modules 22a–22e, but as shown, serves only one such module. This side assembly 30 comprises a solenoid operated, hydraulic valve assembly 32 fluidly connected to the hydraulic power supply 28 and to a common programmable logic controller 34. The programmable logic controller 34 causes the hydraulic valve assembly 32 to selectively direct hydraulic fluid, via hydraulic tubing (not shown), to a shuttle hydraulic cylinder 36 and a gripper hydraulic cylinder 38. The shuttle hydraulic assembly 36 and the gripper hydraulic cylinder 38 translate a shuttle assembly 40 and actuate a gripper 42, respectively. The gripper 42 in this embodiment is attached to the shuttle assembly 40. Accordingly, sequential reciprocal motion of the shuttle assembly 40 will cause the gripper 42 to translate toward and away from an adjustable lumber support 46.

Figure 5:
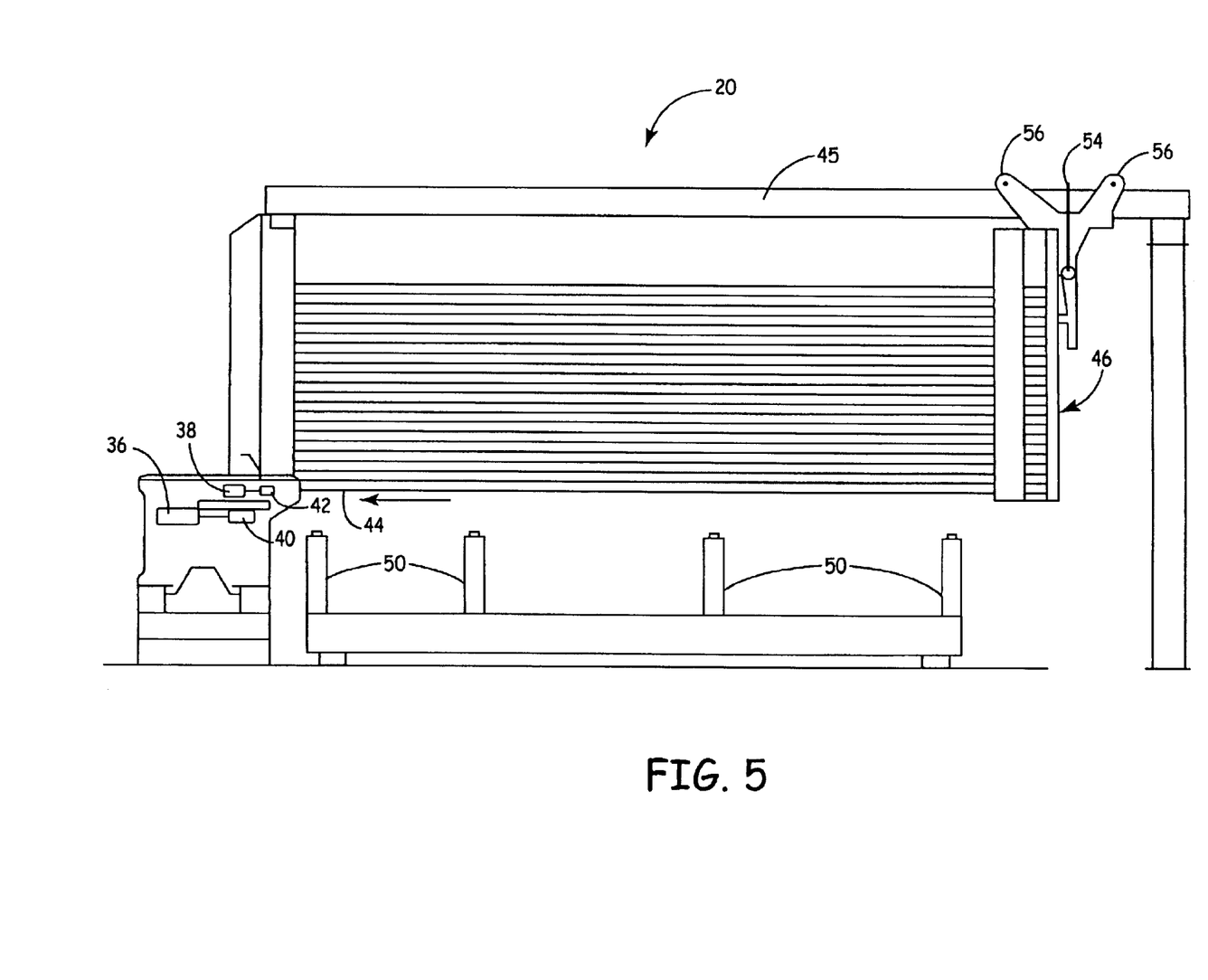
FIGS. 5–7 are side views of the magazine lumber feeder embodiment in FIGS. 3–4 in operation.
Figure 6:
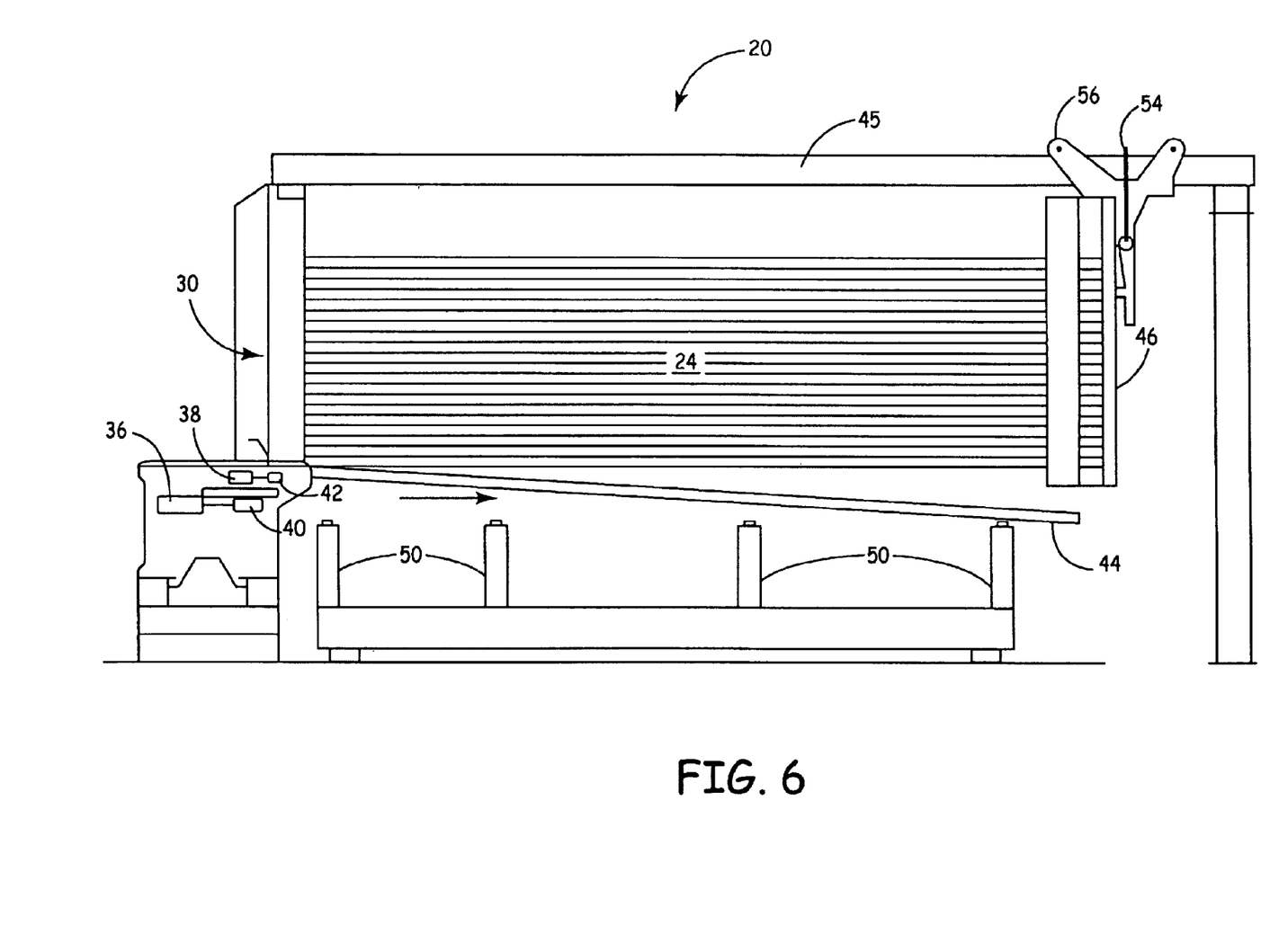
Figure 7:
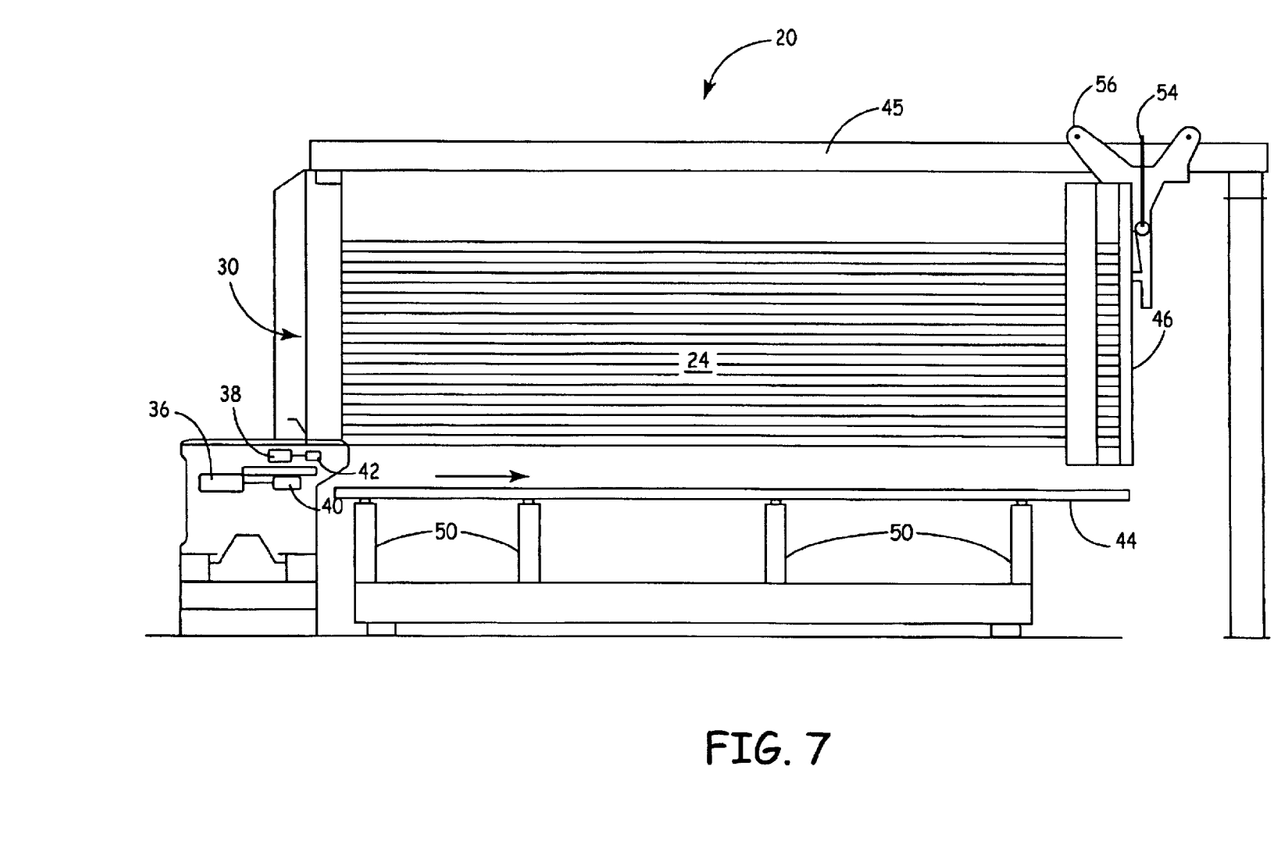

FIGS. 5–7 show the lumber feeder 20 in operation. First, as shown in FIG. 5, hydraulic valve assembly 32 directs hydraulic fluid to the gripper 42, which causes the gripper 42 to grip a bottom most board 44 in a module's stack of boards 24a–24d by clamping onto the board's narrow dimension (e.g., the two (2) inch side of a 2×6 board). Next, the hydraulic valve assembly 32 directs hydraulic fluid to the shuttle hydraulic cylinder 36, which translates the shuttle assembly 40, including the gripper 42, away from the adjustable lumber support 46. This movement pulls the right end of the bottom board 44 (as depicted in FIGS. 5–7) off of the adjustable support 46. The right end of the bottom board 44 then drops onto a chain conveyor 50.

As shown in FIG. 6, after right end of the bottom board 44 has dropped onto the chain conveyor 50, the shuttle hydraulic cylinder translates the shuttle assembly 40 toward the adjustable lumber support 46. This causes the gripper 42 to push the left end of the bottom board 44 (as depicted in FIGS. 5–7) toward the adjustable support 46 until the left end of the bottom board 44 also drops onto the chain conveyor 50. Finally, as shown in FIG. 7, the chain conveyor 50 carries the now separated bottom board 44 to the automatic saw, or the like.

In this embodiment, lumber is manually placed in the machine through an end slot 52a–52e in the fixed side assembly 30. The lumber is stacked with the wide sides of the boards together (e.g., the six (6) inch side of a 2×6 board). This feature allows this embodiment to receive and store a large number of boards.

In this embodiment, the feeder 20 can accommodate different lengths of lumber by first releasing a brake or lock 54 on the adjustable support 46, and then moving the adjustable support 46 on rollers 56 so that it supports the end of the desired boards. The adjustable support 46 in this embodiment is then clamped in the proper position by the brake or lock 54. In some embodiments, each module 22a–22e comprises a separate adjustable support 46. These embodiments are desirable because each module 22a–22e may dispense a different length of lumber. In other embodiments, all of the modules 22a–22e use a common adjustable support 46.

The controller 34 in this embodiment receives electronic signals from the automatic saw, or other device, representing a desired board size. The controller 34 then sends the appropriate signals to the hydraulic valve assembly 34 of the correct module 22a–22e, which causes the feeder 20 to dispense one board 24a–24d. Each request sent to the controller 34 in these embodiments will result in one board 24a–24d being dispensed. If the correct module 22a–22e is out of lumber, the module 22a–22e will send an "empty" signal the controller 34. The controller 34, in turn, will relay this information back to the saw and will alert the operator. In one embodiment, the controller 34 uses a serial based communications method (RS485).

The controller 34 in some embodiments also receives signals from two sensors (not shown) on each module 22a–22e. The first sensor is a position sensor, such as a limit switch, that reports the shuttle's 40 position to allow the gripper 42 to operate at the correct time. The second sensor is a "presence" sensor, such as a photoelectric device or contact switch, which senses when the particular module 22a–22e is out of wood.

Although the present invention has been described in detail with reference to certain embodiments thereof, it may be embodied in other specific forms without departing from the essential spirit or attributes thereof. For example, although the embodiment in FIGS. 3–7 contains five modules, the present invention can use a greater or fewer number of modules 22a–22e. The present invention can also use a different selection of module sizes (e.g., replace the 2×10 module 22a with a 1×2 module). In addition, the second sensor may be adapted to produce a "near empty" signal when one board remains in the module 22a–22e. These embodiments may be desirable because the operator can use the one remaining board to help load new boards into the feeder 20. That is, the one remaining board will act as a guide to help the operator insert the new boards into the module. Also, the gripper 42 may be replaced by two pushplates that engage opposite ends of the board 44. These embodiments may use the methods and apparatuses disclosed in co-pending U.S. patent application Ser. No. 09/510,019, filed Feb. 22, 2000, which is herein incorporated by reference in its entirety.

The present invention offers many advantages over conventional lumber unloading and feeding devices. For example, the present invention can store large numbers of many different sized boards and deliver them upon command to an automatic saw or the like. The present invention also minimizes the risk of jamming due to warped boards. In addition, the modular design of the present invention allows it to be easily scaled and/or specially adapted for to deliver lumber for a particular product. Also, although the present invention has been described with reference to wood boards, it may be used to store and selectively deliver other similar products for automated machinery.

Those skilled in the art will recognize that the accompanying figures and this description depicted and described embodiments of the present invention, and features and components thereof. With regard to means for fastening, mounting, attaching or connecting the components of the present invention to form the mechanism as a whole, unless specifically described otherwise, such means were intended to encompass conventional fasteners such as machine screws, nut and bolt connectors, machine threaded connectors, snap rings, screw clamps, rivets, nuts and bolts, toggles, pins and the like. Components may also be connected by welding, friction fitting, adhesives, or deformation, if appropriate. Unless specifically otherwise disclosed or taught, materials for making components of the present invention were selected from appropriate materials, such as metal, metallic alloys, fibers, polymers and the like, and appropriate manufacturing or production methods including casting, extruding, molding and machining may be used. In addition, any references to front and back, right and left, top and bottom and upper and lower were intended for convenience of description, not to limit the present invention or its components to any one positional or spacial orientation. Therefore, it is desired that the embodiments described herein be considered in all respects as illustrative, not restrictive, and that reference be made to the appended claims for determining the scope of the invention.

What is claimed is:

1. A material handling apparatus, comprising:
   (a) a first load supporting surface and a second load supporting surface that cooperate to support a first end and a second end of an item;
   (b) an item receiver located below the first and second load supporting surfaces; and
   (c) a shuttle adapted to operably engage the item and to translate the item reciprocally, sequentially off the first and second load supporting surfaces, thereby allowing the item to drop onto the item receiver.

2. The apparatus of claim 1, wherein the shuttle comprises a gripper adapted to clamp onto the item.

3. The apparatus of claim 2, wherein the shuttle further comprises a hydraulic cylinder adapted to translate the gripper.

4. An apparatus for selectively delivering items, comprising:
   (a) a first load supporting surface and a second load supporting surface that cooperate to support a first end and a second end of a first item;
   (b) an item receiver located below the first and second load supporting surfaces;
   (c) a first bias element that biases the first end of the item off the first load supporting surface, said first bias element comprising a gripper operatively attached to a shuttle; and
   (d) a second bias element that biases the second end of the item off the second load supporting surface, thereby allowing the item to drop onto the item receiver.

5. The apparatus of claim 4, wherein the second bias element comprises a gripper operatively attached to a shuttle.

6. The apparatus of claim 4, further comprising;
   (a) a third load supporting surface and a fourth load supporting surface that cooperate to support a first end and a second end of a second item;
   (b) a third bias element that biases the first end of the second item off the third load supporting surface; and
   (c) a fourth bias element that biases the second end of the second item off the fourth load supporting surface, thereby allowing the second item to drop onto the item receiver.

7. The apparatus of claim 4, wherein the first item is a board of lumber.

8. A magazine unloader for selectively delivering a plurality of first boards and a plurality of second boards, the magazine unloader comprising:
   (a) a first module adapted to receive a plurality of first boards, said first module being adjustable to receive a plurality of board sizes;
   (b) a second module adapted to receive a plurality of second boards;
   (c) a first bias assembly adapted to bias a board in the plurality of first boards out of the first module; and
   (d) a second bias assembly adapted to bias a board in the plurality of second boards out of the second module.

9. The magazine unloader of claim 8, wherein the first boards and the second boards have different sizes.

10. The magazine unloader of claim 8, wherein the first bias assembly comprises a gripper operatively attached to a shuttle.

11. The magazine unloader of claim 10, wherein the second bias assembly comprises a gripper operatively attached to a shuttle.

12. A material handling apparatus, comprising:
    (a) a first load supporting surface and a second load supporting surface that cooperate to support a first end and a second end of an item;
    (b) an item receiver located below the first and second load supporting surfaces; and
    (c) a shuttle adapted to operably engage the item and to reciprocally, sequentially translate the item off the first then the second load supporting surfaces, thereby allowing the item to drop onto the item receiver, wherein the translation to translate the item off the first supporting surface places the item in tension.

13. A material handling apparatus, comprising:
    (a) a first load supporting surface and a second load supporting surface that cooperate to support a first end and a second end of an item;
    (b) an item receiver located below the first and second load supporting surfaces; and
    (c) a shuttle adapted to operable engage the item and to reciprocally, sequentially translate the item off the first then the second load supporting surfaces, thereby allowing the item to drop onto the item receiver, wherein the translation to translate the item off the first supporting surface places the item in tension and wherein the shuttle comprises a gripper adapted to clamp onto the item.

14. The apparatus of claim 13, wherein the shuttle further comprises a hydraulic cylinder adapted to translate the gripper.

15. The apparatus of claim 13, wherein the item is a board of lumber.

16. The apparatus of claim 13, comprising:
    (a) a third load supporting surface and a fourth load supporting surface that cooperate to support a first end and a second end of a second item, wherein the third and fourth load supporting surfaces are located above the item receiver; and
    (b) a second shuttle adapted to operably engage the second item and to reciprocally, sequentially translate the second item off the third then the fourth load supporting surfaces, thereby allowing the second item to drop onto the item receiver, wherein the translation to translate the second item off the third supporting surface places the second item in tension.

17. The apparatus of claim 13, wherein the first load supporting surface is adjustably mounted.

18. The apparatus of claim 17, wherein the translation pulls the item from said first load supporting surface.

* * * * *